United States Patent
Chang et al.

(10) Patent No.: US 12,536,987 B2
(45) Date of Patent: Jan. 27, 2026

(54) METHOD AND DEVICE FOR SPEECH SYNTHESIS BASED ON MULTI-SPEAKER TRAINING DATA SETS

(71) Applicant: Industry-University Cooperation Foundation Hanyang University, Seoul (KR)

(72) Inventors: Joon Hyuk Chang, Seoul (KR); Jae Uk Lee, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 204 days.

(21) Appl. No.: 18/284,146

(22) PCT Filed: Nov. 19, 2021

(86) PCT No.: PCT/KR2021/017121
§ 371 (c)(1),
(2) Date: Sep. 26, 2023

(87) PCT Pub. No.: WO2022/203152
PCT Pub. Date: Sep. 29, 2022

(65) Prior Publication Data
US 2024/0169973 A1    May 23, 2024

(30) Foreign Application Priority Data
Mar. 26, 2021  (KR) .......... 10-2021-0039888

(51) Int. Cl.
*G10L 13/08* (2013.01)
*G10L 13/027* (2013.01)

(52) U.S. Cl.
CPC ............ *G10L 13/08* (2013.01); *G10L 13/027* (2013.01)

(58) Field of Classification Search
CPC ..... G10L 13/08; G10L 13/027; G10L 13/033; G10L 13/02; G10L 15/04; G10L 17/04; G10L 17/14; G10L 25/18
(Continued)

(56) References Cited

U.S. PATENT DOCUMENTS 6,813,604 B1 * 11/2004 Shih ............... G10L 13/033
                                              704/260
10,699,697 B2 * 6/2020 Qian ............... G10L 15/063
(Continued)

FOREIGN PATENT DOCUMENTS

KR  10-2019-0008137 A   1/2019
KR  10-2019-0100095 A   8/2019

OTHER PUBLICATIONS

Kurniawati Azizah et al., "Hierarchical Transfer Learning for Multilingual, Multi-Speaker, and Style Transfer DNN-Based TTS on Low-Resource Languages", IEEE Access, Sep. 29, 2020, vol. 8, pp. 179798-179812.
(Continued)

*Primary Examiner* — Thuykhanh Le
(74) *Attorney, Agent, or Firm* — Sughrue Mion, PLLC

(57) ABSTRACT

An exemplary embodiment of the present disclosure is a speech synthesis method based on multi-speaker training dataset of a speech synthesis apparatus including pre-training a speech synthesis model using a previously stored neural network with a single speaker training dataset with most spoken sentences, among training datasets of a plurality of speakers, fine-tuning the pre-trained speech synthesis model with a training dataset of a plurality of speakers, and applying a target speech dataset to the fine-tuned speech synthesis model to be converted into a mel spectrogram.

12 Claims, 7 Drawing Sheets

(58) Field of Classification Search
USPC .......................................................... 704/259
See application file for complete search history.

(56) References Cited

U.S. PATENT DOCUMENTS

| | | | | |
|---|---|---|---|---|
| 10,930,263 | B1* | 2/2021 | Mahyar | G10L 15/16 |
| 11,276,389 | B1* | 3/2022 | Aryal | G10L 13/047 |
| 11,410,684 | B1* | 8/2022 | Klimkov | G10L 13/027 |
| 11,605,388 | B1* | 3/2023 | Gupta | A63F 13/424 |
| 2005/0182630 | A1* | 8/2005 | Miro | G10L 13/08 |
| | | | | 704/E13.011 |
| 2007/0168189 | A1* | 7/2007 | Tamura | G10L 13/033 |
| | | | | 704/235 |
| 2007/0256189 | A1* | 11/2007 | Tian | G10L 13/033 |
| | | | | 800/278 |
| 2008/0195386 | A1* | 8/2008 | Proidl | G10L 13/033 |
| | | | | 704/235 |
| 2009/0177473 | A1* | 7/2009 | Aaron | G10L 13/033 |
| | | | | 704/260 |
| 2010/0198600 | A1* | 8/2010 | Masuda | G10L 13/033 |
| | | | | 704/E21.001 |
| 2011/0087488 | A1* | 4/2011 | Morinaka | G10L 13/06 |
| | | | | 704/207 |
| 2011/0218804 | A1* | 9/2011 | Chun | G10L 15/14 |
| | | | | 704/E13.011 |
| 2012/0059654 | A1* | 3/2012 | Nishimura | G10L 13/02 |
| | | | | 704/243 |
| 2012/0095767 | A1* | 4/2012 | Hirose | G10L 13/033 |
| | | | | 704/258 |
| 2014/0052447 | A1* | 2/2014 | Tachibana | G10L 13/08 |
| | | | | 704/260 |
| 2015/0058015 | A1* | 2/2015 | Mitsufuji | G10L 21/003 |
| | | | | 704/243 |
| 2015/0112687 | A1* | 4/2015 | Bredikhin | G10L 21/003 |
| | | | | 704/260 |
| 2015/0127350 | A1* | 5/2015 | Agiomyrgiannakis | |
| | | | | G10L 13/02 |
| | | | | 704/235 |
| 2015/0187356 | A1* | 7/2015 | Aronowitz | G10L 17/24 |
| | | | | 704/249 |
| 2015/0228271 | A1* | 8/2015 | Morita | G10L 13/033 |
| | | | | 704/258 |
| 2017/0301340 | A1* | 10/2017 | Yassa | G10L 25/27 |
| 2018/0211649 | A1* | 7/2018 | Li | G10L 13/047 |
| 2019/0019500 | A1* | 1/2019 | Jang | G10L 15/063 |
| 2019/0244623 | A1* | 8/2019 | Hall | G06T 13/40 |
| 2020/0058290 | A1* | 2/2020 | Chae | G10L 13/00 |
| 2020/0135209 | A1* | 4/2020 | Delfarah | G10L 17/04 |
| 2020/0342852 | A1* | 10/2020 | Kim | G06N 3/044 |
| 2020/0349922 | A1* | 11/2020 | Peyser | G06N 3/09 |
| 2020/0372897 | A1* | 11/2020 | Battenberg | G06N 3/045 |
| 2020/0380952 | A1* | 12/2020 | Zhang | G10L 13/047 |
| 2020/0394998 | A1* | 12/2020 | Kim | G06N 3/0455 |
| 2020/0410976 | A1* | 12/2020 | Zhou | G06N 3/048 |
| 2021/0020161 | A1* | 1/2021 | Gao | G10L 13/00 |
| 2021/0209315 | A1* | 7/2021 | Jia | G10L 13/00 |
| 2021/0217404 | A1* | 7/2021 | Jia | G10L 13/04 |
| 2021/0248997 | A1* | 8/2021 | Yu | G06N 3/045 |
| 2022/0013106 | A1* | 1/2022 | Deng | G06N 3/0475 |
| 2022/0051655 | A1* | 2/2022 | Kanagawa | G10L 25/30 |
| 2022/0068256 | A1* | 3/2022 | Jia | G10L 13/033 |
| 2022/0068257 | A1* | 3/2022 | Biadsy | G10L 15/16 |
| 2022/0068259 | A1* | 3/2022 | Pan | G10L 25/63 |
| 2022/0122579 | A1* | 4/2022 | Biadsy | G06N 3/0464 |
| 2022/0148562 | A1* | 5/2022 | Park | G10L 13/047 |
| 2022/0189455 | A1* | 6/2022 | Pekar | G10L 13/10 |
| 2022/0230625 | A1* | 7/2022 | Zhu | G06F 18/2155 |
| 2022/0230629 | A1* | 7/2022 | Zhu | G06N 3/042 |
| 2022/0238116 | A1* | 7/2022 | Gao | G10L 17/02 |
| 2022/0293091 | A1* | 9/2022 | Pan | G10L 25/63 |
| 2022/0301542 | A1* | 9/2022 | Sung | G10L 13/00 |
| 2022/0310058 | A1* | 9/2022 | Zhao | G10L 17/22 |
| 2022/0406289 | A1* | 12/2022 | Kanagawa | G10L 25/87 |
| 2023/0081659 | A1* | 3/2023 | Pan | G10L 13/033 |
| | | | | 704/259 |
| 2023/0178066 | A1* | 6/2023 | Chang | G10L 17/18 |
| | | | | 704/232 |
| 2023/0186937 | A1* | 6/2023 | Uhlich | G10L 15/22 |
| | | | | 704/251 |
| 2023/0298567 | A1* | 9/2023 | Tan | G10L 13/00 |
| | | | | 704/243 |

OTHER PUBLICATIONS

Henry B. Moss et al., "Boffin TTS: Few-Shot Speaker Adaptation by Bayesian Optimization", Amazon Research, 5 Pages.

International Search Report for PCT/KR2021/017121 dated Jul. 19, 2022.

* cited by examiner

[Fig. 1]
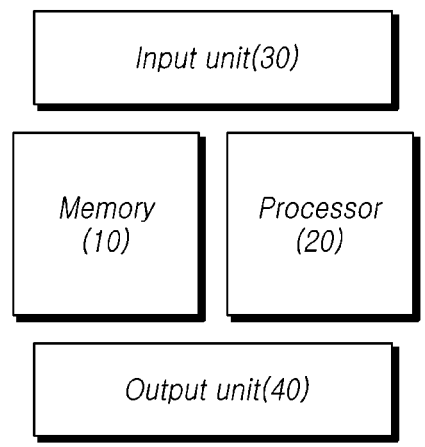

[Fig. 2]
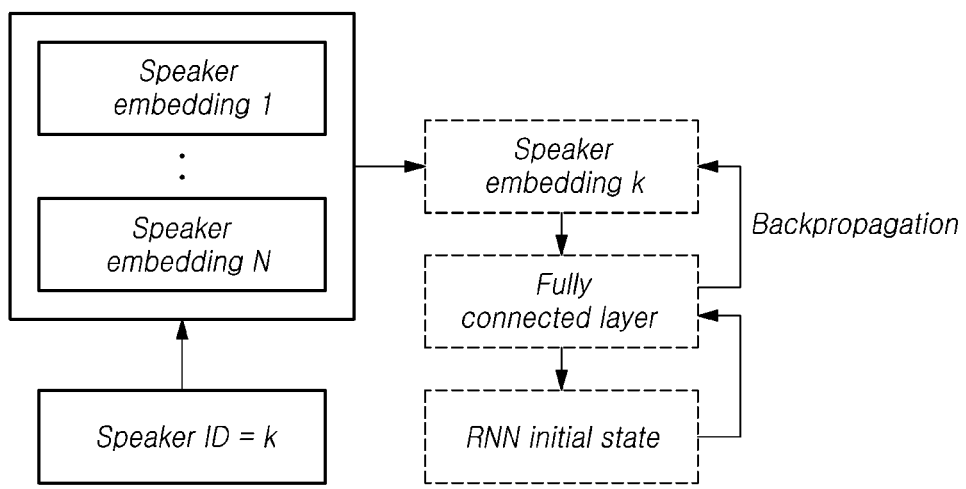

[Fig. 3]
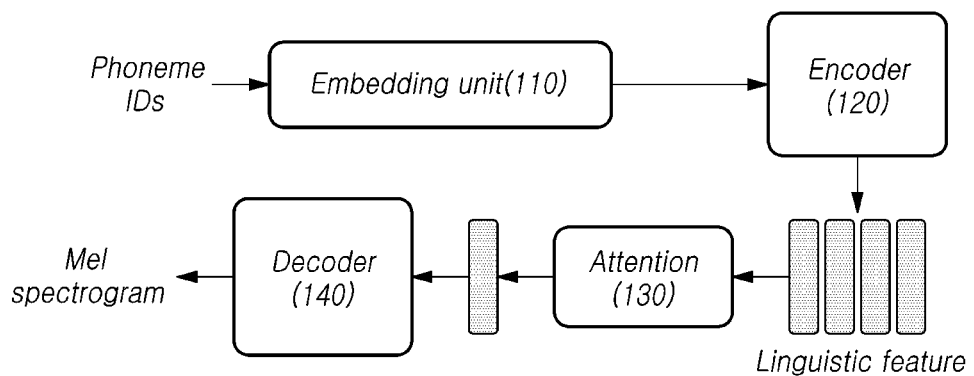

[Fig. 4]
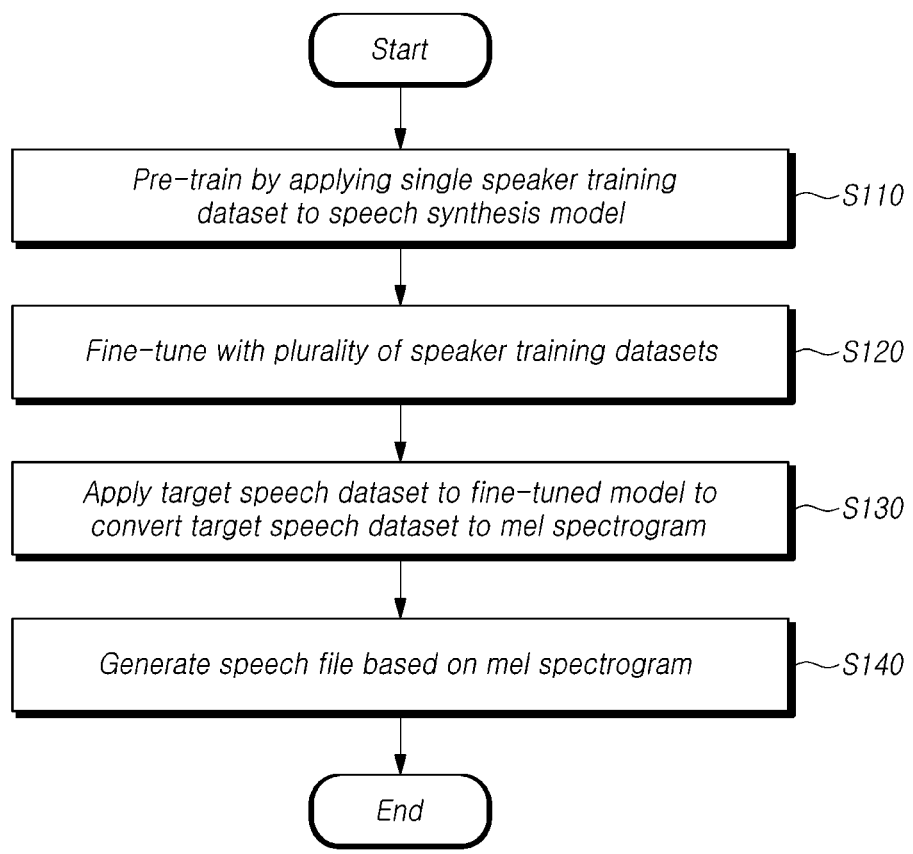

[Fig. 5]
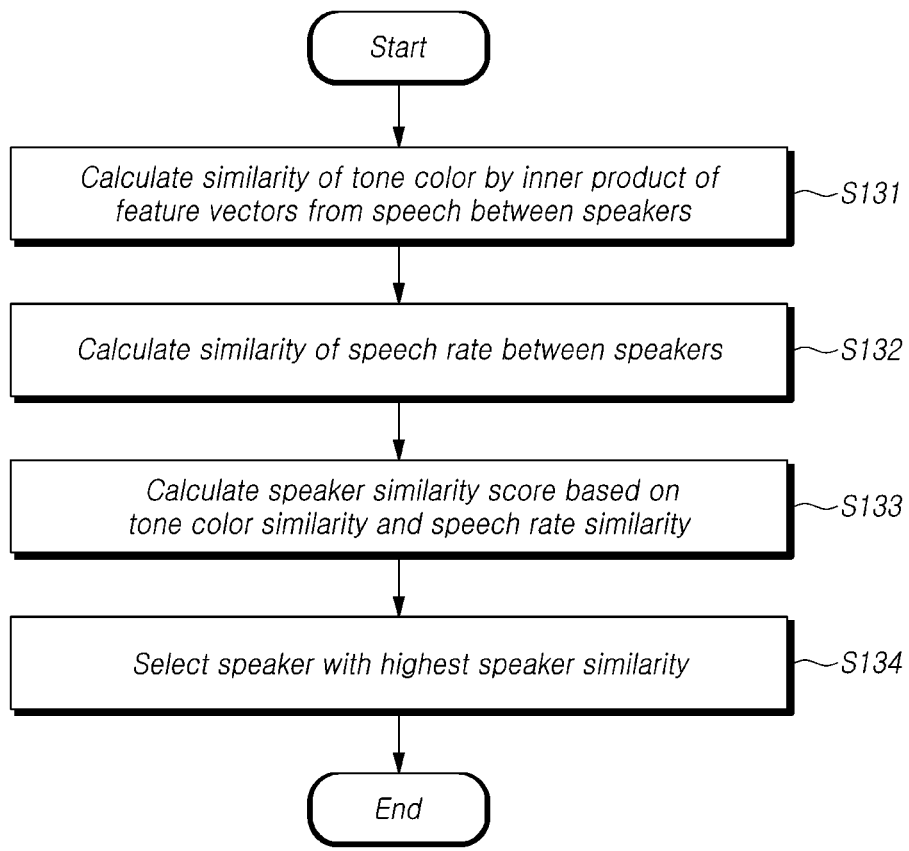

[Fig. 6]
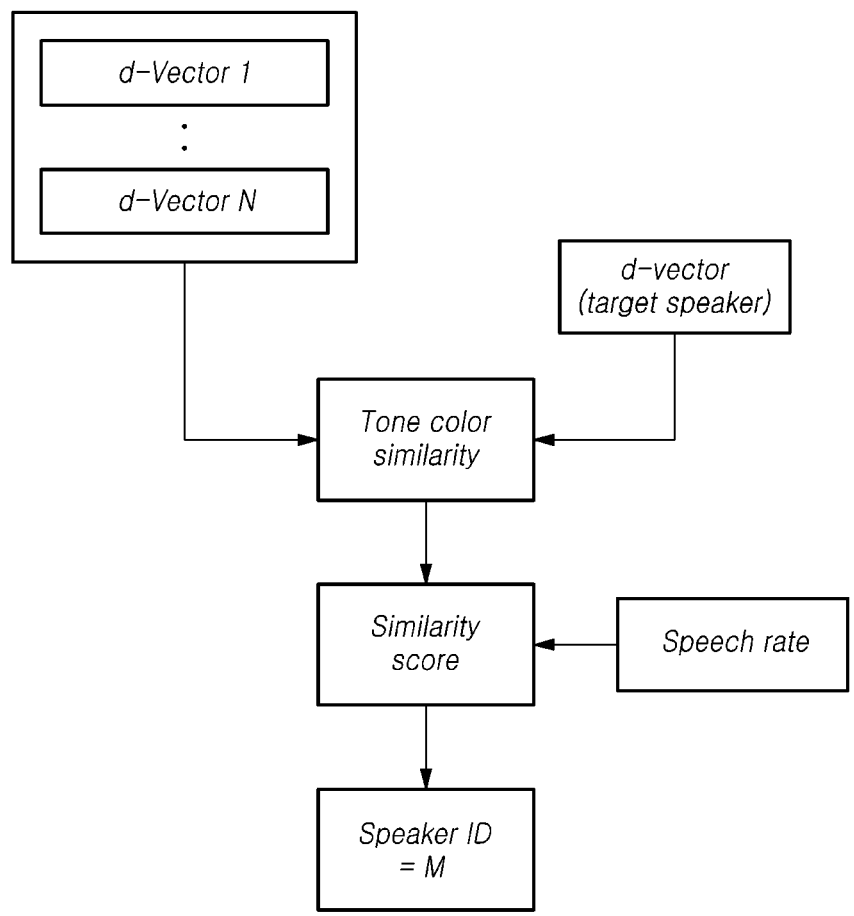

[Fig.7]
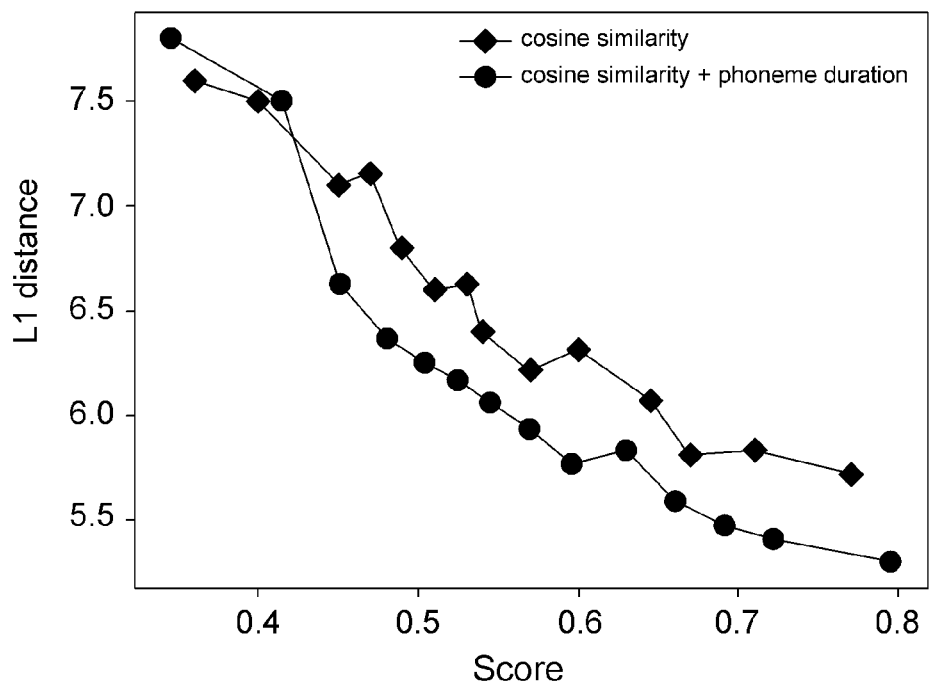

METHOD AND DEVICE FOR SPEECH SYNTHESIS BASED ON MULTI-SPEAKER TRAINING DATA SETS

This Application is a National Stage of International Application No. PCT/KR2021/017121 filed Nov. 19, 2021, claiming priority based on Korean Patent Application No. 10-2021-0039888 filed Mar. 26, 2021.

TECHNICAL FIELD

The present disclosure relates to a speech synthesis method and apparatus based on a multi-speaker training dataset, and more particularly, to a speech synthesis method and apparatus based on a robust model built by fine-tuning a model which is trained based on a single-speaker training dataset with a multi-speaker training dataset.

BACKGROUND ART

A speech synthesis technique is a technique which creates speech data from sentence data. The speech synthesis technique is utilized to create a speech for the input sentence.

The earliest speech synthesis technology is a concatenative speech synthesis which records a sound for each phoneme by a human and then connects the recorded sound to create a speech for the sentence. However, the people speak with different prosodies according to a speech so that this method has a problem in that it is difficult to create a speech as natural as a real person speaks.

The subsequent speech synthesis technology is a parametric speech synthesis. According to this technology, various features, such as a feature for each phoneme, a feature for a fundamental frequency, and a spectrogram, are coupled to form a waveform and as described above, the waveform is formed by utilizing the features, by means of human hands so that the speech is not natural.

Thereafter, an end-to-end type speech synthesis system which utilizes the deep learning is introduced based on the above-described technologies. The end-to-end is a structure which is configured only by the deep learning without human intervention from beginning to end.

Based on this deep learning technology, a single-speaker speech synthesis model is developed to a multi-speaker speech synthesis model. A single speaker speech synthesis model may synthesize a speech with only one person's voice and the multi-speaker speech synthesis model may synthesize a speech with voices of a plurality of speakers with one speech synthesis model.

Here, in the multi-speaker speech synthesis model, when trained speaker embedding is used, it shows better performance than the case that a fixed value is used. However, for the multi-speaker training, a dataset configured by speeches and texts of a plurality of speakers is necessary and a large amount of dataset for each speaker is requested and much training time is necessary.

DISCLOSURE

Technical Problem

The present disclosure provides a method and a system for improving a performance of a multi-speaker speech synthesis model by training only with a few seconds of data for a single speaker.

Problems to be solved by the present disclosure are not limited to the above-mentioned problem(s), and other problem(s), which is (are) not mentioned above, can be clearly understood by those skilled in the art from the following descriptions.

Technical Solution

In order to achieve the object, a speech synthesis method based on multi-speaker training dataset of a speech synthesis apparatus provided by the present disclosure includes pre-training by applying a single speaker training dataset with most spoken sentences, among training datasets of a plurality of speakers, to a speech synthesis model using a previously stored neural network; fine-tuning the pre-trained speech synthesis model with a training dataset of a plurality of speakers; and applying a target speech dataset to the fine-tuned speech synthesis model to be converted into a mel spectrogram.

In one exemplary embodiment, a speech synthesis method based on a multi-speaker training dataset of a speech synthesis apparatus may further include generating a waveform type speech file based on the mel spectrogram.

In one exemplary embodiment, the converting to a mel spectrogram includes: selecting a speaker with a high similarity to a target speech, among previously stored training datasets of a plurality of speakers, based on the target speech dataset; and setting speaker embedding of the selected speaker as an initial value of the fine-tuned speech synthesis model.

In one exemplary embodiment, the selecting of a speaker with a high similarity calculates the similarity based on the tone color and the speech rate between the speakers.

In one exemplary embodiment, the selecting of a speaker with a high similarity includes: calculating a similarity of a tone color by extracting a feature vector from the speech between the speakers and using the inner product; calculating a phoneme duration of each speaker and calculating a similarity of a speech rate by dividing the phoneme duration of the trained speaker by a phoneme duration of the target speaker; calculating a tone color similarity score between two speakers based on the similarity of the tone color and the similarity of the speech rate; and selecting a speaker with the highest tone color similarity score as a speaker with the most similar speaking characteristic.

In one exemplary embodiment, the speech synthesis model conditions each speaker based on trainable speaker embedding and a one-hot vector.

In one exemplary embodiment, the speech synthesis model conditions the target speaker based on speaker embedding and a score vector and the score vector is calculated by multiplying a one-hot vector of a speaker selected as a speaker with the most similar speaking characteristic to the target speaker and the similarity score.

Further, in order to achieve the above-described objects, a speech synthesis apparatus based on multi-speaker training dataset provided by the exemplary embodiment of the present disclosure includes a memory which stores one or more instructions; and a processor which executes the one or more instructions which are stored in the memory. The processor executes the one or more instructions to pre-train a speech synthesis model using a previously stored neural network with a single speaker training dataset with most spoken sentences, among training datasets of a plurality of speakers; fine-tune the pre-trained speech synthesis model with a training dataset of a plurality of speakers; and apply a target speech dataset to the fine-tuned speech synthesis model to be converted into mel spectrogram.

Advantageous Effects

A speech synthesis apparatus based on a multi-speaker training dataset according to an exemplary embodiment of the present disclosure may train to produce a good performance only with a small amount of training dataset.

Further, according to the exemplary embodiment of the present disclosure, a new speaker is adaptively trained only with seconds to minutes of data rather than tens of minutes of data so that the data efficiency is excellent.

DESCRIPTION OF DRAWINGS

FIG. 1 is a view illustrating a schematic configuration of a speech synthesis system according to an exemplary embodiment of the present disclosure.

FIG. 2 is a view illustrating a process of a speaker embedding table according to an exemplary embodiment of the present disclosure.

FIG. 3 is a block diagram illustrating a configuration for speech synthesis of a processor according to an exemplary embodiment of the present disclosure.

FIG. 4 is a flowchart for explaining a speech synthesis method based on a multi-speaker training dataset according to an exemplary embodiment of the present disclosure.

FIG. 5 is a flowchart for explaining a method for selecting a speaker having a high similarity according to an exemplary embodiment of the present disclosure.

FIG. 6 is a conceptual view illustrating a selecting method of a speaker with a high similarity according to an exemplary embodiment of the present disclosure.

FIG. 7 is a graph illustrating a speaking characteristic between speakers according to a result of a similarity score calculating equation according to an exemplary embodiment of the present disclosure.

BEST MODE

Those skilled in the art may make various modifications to the present disclosure and the present disclosure may have various embodiments thereof, and thus specific embodiments will be illustrated in the drawings and described in detail in detailed description. However, this does not limit the present disclosure within specific exemplary embodiments, and it should be understood that the present disclosure covers all the modifications, equivalents and replacements within the spirit and technical scope of the present disclosure. In the description of respective drawings, similar reference numerals designate similar elements.

Terms such as first, second, A, or B may be used to describe various components but the components are not limited by the above terms. The above terms are used only to distinguish one component from the other component. For example, without departing from the scope of the present disclosure, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween.

In addition, the term "-unit" described in the specification means a unit for processing at least one function and operation and may be implemented by hardware components or software components or combinations thereof.

Terms used in the present application are used only to describe specific exemplary embodiments, and are not intended to limit the present disclosure. A singular form may include a plural form if there is no clearly opposite meaning in the context. In the present disclosure, it should be understood that terminology "include" or "have" indicates that a feature, a number, a step, an operation, a component, a part or the combination thereof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Prior to detailed description of the present disclosure, Tacotron produced by Google, an end-to-end speech synthesis system, which is applied to the present disclosure as the related art technology (Yuxuan Wang, R J SkerryRyan, Daisy Stanton, Yonghui Wu, Ron J. Weiss, Navdeep Jaitly, Zongheng Yang, Ying Xiao, Zhifeng Chen, Samy Bengio, Quoc Le, Yannis Agiomyrgiannakis, Rob Clark, and Rif A. Saurous, Tacotron: Towards End-to-End Speech Synthesis, Interspeech 2017) has generally four modules (an encode, an attention, a decoder, and a vocoder). The encoder is a model→module which extracts a feature for each phoneme from a text. The decoder is a module which produces a mel spectrogram. The attention compares a feature sequence of each phonemes output from the encoder and a mel spectrogram to map each phonemes to the mel spectrogram. For example, after finding a mel spectrogram which processes a sound corresponding to "H" from an example of a text "HELLO" to assign a weight to "H" among "H", "E,", "L", "L", and "O", a mel spectrogram for the sound corresponding to "H" is created in the decoder. The vocoder converts the mel spectrogram generated as described above into a speech waveform. Tacotron generates a waveform using Griffin-Lim algorithm (Daniel W. Griffin and Jae S. Lim, Signal Estimation from Modified Short-Time Fourier Transform, IEEE Transactions on Acoustics, Speech, and Signal Processing, 1984).

Thereafter, the performance of Tacotron is enhanced to design Tacotron 2 (J. Shen, R. Pang, R. J. Weiss, M. Schuster, N. Jaitly, Z. Yang, Z. Chen, Y. Zhang, Y. Wang, R. Skerry-Ryan, R. A. Saurous, Y. Agiomyrgiannakis and Y. Wu, u. Natural TTS synthesis by conditioning Wavenet on mel spectrogram predictions, International Conference on Acoustics, Speech, and Signal Processing). Tacotron2 is a high performance speech synthesis model which is difficult to distinguish from real human speech. Tactron1 and Tactron2 are single-speaker speech synthesis models. The single speaker speech synthesis model may synthesize the speech with only one person's voice.

Thereafter, there are many studies about a multi-speaker speech synthesis model. The multi-speaker speech synthesis model will be briefly described. Tacotron may synthesize the speech with voices of a plurality of speakers using one speech synthesis model. The entire structure of the multi-speaker speech synthesis model is configured by an encoder, an attention, a decoder, and a vocoder, similar to Tacotron. With this structure, speaker embedding is used to express voices of a plurality of persons. The speaker embedding is a vector which expresses each speaker. The speaker embedding is conditioned in the speech synthesis model. When a speaker embedding corresponding to each speaker is input, the speech is synthesized with the speaker's voice. As a representative multi-speaker speech synthesis model, there is DeepVoice2 (S. Arik, G. Diamos, A. Gibiansky, J. Miller, K. Peng, W. Ping, J. Raiman, Y. Zhou. Deep voice 2: Multi-speaker neural text-to-speech, Neural Information Processing Systems, 2017). DeepVoice2 may synthesize speeches of a plurality of speakers. The speaker embedding used in DeepVoice2 is trainable. Accordingly, after randomly initializing the speaker embedding, the speech synthesis model and the speaker embedding are trained with multi-speaker training data to obtain a value suitable to express with a voice of a corresponding speaker. The speaker embedding trained as described as such is not used, but a speaker embedding with a fixed value may also be used. Generally, when the multi-speaker speech synthesis model is implemented, if trained speaker embedding is used, it shows better performance than the case that a fixed value is used. However, for the multi-speaker training, a dataset configured by speeches and texts of a plurality of speakers is necessary and in the related art, there is a problem in that massive data of 20 minutes or longer is necessary for every speaker.

Hereinafter, exemplary embodiments according to the present disclosure will be described in detail with reference to accompanying drawings.

FIG. 1 is a view illustrating a schematic configuration of a speech synthesis system according to an exemplary embodiment of the present disclosure and FIG. 2 is a view illustrating a process of a speaker embedding table according to an exemplary embodiment of the present disclosure.

Referring to FIG. 1, the speech synthesis system according to an exemplary embodiment of the present disclosure may include a memory 10 and a processor 20. Further, the speech synthesis system may further include an input unit 30 and an output unit 40.

The memory 10 may store a program, an instruction, or data for an operation of a speech synthesis system. Specifically, the memory 10 may be implemented as a non-volatile memory, a volatile memory, a flash memory, a hard disk driver (HDD), or a solid state drive (SSD). The memory 10 is accessed by the processor 20 and the data thereof may be read/recorded/modified/deleted/updated by the processor 20.

In one exemplary embodiment, the memory 10 may store a speech synthesis model and a multi-speaker training deep learning model, to be described below, and also store a speaker embedding table.

Here, the speech synthesis model may employ a high performance single speaker speech synthesis model, or Tacotron2.

Referring to FIG. 2, the speaker embedding table is a virtual table which stores speaker embedding (vector expressing each speaker) of a plurality of speakers and stores by matching a speaker ID which is an identification number allocated to each speaker. Generally, the speaker ID starts from 0.

Next, when a dataset of a specific speaker is to be trained by the processor 20, the speaker ID from the embedding table is input to output the corresponding speaker embedding. The speaker embedding converts a size by a fully connected layer to be input as an initial state of a recurrent neural network. Thereafter, it is trained to form an appropriate value for each speaker by means of backpropagation from the speech synthesis model.

Generally, in the case of the speech synthesis model configured by the recurrent neural network, the specific speaker embedding is input as an initial state of the recurrent neural network. The recurrent neural network is a neural network which uses a previous output value as a current input value. The recurrent neural network follows Equations 1 and 2.

$$h_t = \tan h(W_{hh} h_{t-1} + W_{xh} x_t + b_h)$$ [Equation 1]

$$h_t = W_{hy} h_t + b_y$$ [Equation 2]

Here, W and b are training parameters, h is a state, and x is an input value of a recurrent neural network. A state of a previous time step is input to form a state of a current time step and calculate an output value therewith. This state affects the entire time steps of the recurrent neural network and has a different value for each time step. Accordingly, when the speaker embedding is input as the initial state, the speaker embedding may effectively affect the entire output value of the recurrent neural network. Therefore, in the speaker embedding table, the output speaker embedding is input as the initial state of the recurrent neural network of the Tactron2 encoder and decoder to configure a multi-speaker speech synthesis model.

For multi-speaker training, a dataset configured by a plurality of speakers is used. The multi-speaker training dataset is generally configured by data of approximately 20 minutes or longer for every speaker. Generally, for single speaker training, massive datasets of 20 hours or more is used. The massive dataset of 20 hours is used because when the training is performed on as many vocabularies as possible, a speech with a good performance is also produced for a spoken sentence which is not trained. As compared with 20-hour dataset, 20-minute multi-speaker dataset has fewer vocabularies to train. In order to compensate therefor, first, a fine-tuning technique is utilized. The fine-tuning will be described in detail below.

The multi-speaker training deep learning model may be a model which is constructed to train multi-speaker speech based on a neural network.

The processor 20 is electrically connected to a component of a speech synthesis system to control overall operations and functions of the speech synthesis system. In one exemplary embodiment, the processor 20 extracts a single speaker dataset with many spoken sentences using the multi-speaker training deep learning model stored in the memory 10, prior to the multi-speaker training, to perform the single speaker pre-training, and then perform the multi-speaker training.

The input unit 30 is a device which receives or acquires a user's speech, for example, may be a microphone, but is an example, so that the input unit may be configured by another configuration (an input terminal).

The output unit 40 is a device which outputs various audio feedbacks, for example, may be a speaker, but is an example, so that the output unit may be configured by another configuration (an output terminal). The output unit may be electrically connected.

The configurations illustrated in FIG. 1 are an exemplary view for implementing exemplary embodiments of the present disclosure and appropriate hardware/software configurations which are apparent to those skilled in the art may be additionally included in the speech synthesis system.

In one exemplary embodiment, the processor 20 executes at least one instruction stored in the memory 10 to perform multi-speaker speech synthesis and speaker adaptation.

FIG. 3 is a block diagram illustrating a configuration for speech synthesis of a processor according to an exemplary embodiment of the present disclosure.

As illustrated in FIG. 3, the processor may include an embedding unit 110, an encoding unit 120, an attention 130, and a decoding unit 140. The processor may further include a vocoder 150.

The embedding unit 110 inputs an input phoneme ID to a phoneme embedding table to convert phonemes into a high-dimensional vector having various features.

The encoder 120 synthesizes a linguistic feature vector by inputting a high-dimensional vector of phonemes.

The attention 130 determines which sound for which phoneme should be generated in the attention 130 by inputting the speech feature vector to assign a weight to the corresponding phoneme to produce a context vector by processing the weight of the speech feature vector. At this time, the attention 130 may be configured including an acoustic model. The acoustic model is configured by a recurrent neural network and an attention mechanism which helps the recurrent neural network to receive an appropriate sentence speaker data in accordance with a time order may be used.

The decoder 140 receives the context vector to convert into the mel spectrogram.

The vocoder 150 generates a waveform type speech file based on the mel spectrogram.

FIG. 4 is a flowchart for explaining a speech synthesis method based on a multi-speaker training dataset according to an exemplary embodiment of the present disclosure, FIG. 5 is a flowchart for explaining a method for selecting a speaker having a high similarity according to an exemplary embodiment of the present disclosure, and FIG. 6 is a conceptual view illustrating a selecting method of a speaker with a high similarity according to an exemplary embodiment of the present disclosure.

In step S110, a speech synthesis model using a neural network stored in advance is pre-trained with a single speaker training dataset with most spoken sentences, among training datasets of a plurality of speakers.

The speech synthesis model using a neural network expresses a speaker based on speaker embedding which may train each speaker and a one-hot vector. Here, the one-hot vector is a vector in which only one of all the indexes is 1 and the remaining is 0 and may express each speaker to be identified, using the one-hot vector. 1 is inserted into an index which has a length as many as the number of speakers used for the multi-speaker training and corresponds to a speaker ID of each speaker to configure the one-hot vector of each speaker. The one-hot vector is coupled to an output value of the encoder.

As described above, the one-hot vector which expresses a speaker is added so that during the multi-speaker training through one speech synthesis model of the related art, speaker embedding for a plurality of speakers needs to be processed. Accordingly, the problem in that as the number of speakers for the training is increased, the performance is degraded may be solved.

In step S120, the pre-trained speech synthesis model is fine-tuned with a training dataset of a plurality of speakers. As described above, after training with a single speaker dataset with many spoken sentence, the training is performed one more with a multi-speaker dataset so that a robust model for more various vocabularies may be constructed than the training only with a multi-speaker dataset.

In step S130, a target speech dataset is applied to the fine-tuned speech synthesis model to be converted into the mel spectrogram.

The target speech dataset is a small amount of dataset for a new speaker so that overfitting needs to be avoided.

The deep learning model is generally trained using gradient descent.

The gradient descent may be defined as in Equation 3.

$$w_j = w_{j-1} - \alpha \frac{\partial}{\partial w} J \qquad \text{[Equation 3]}$$

Here, J is a cost function. The cost function is a function for a difference between an actual correct answer and a value predicted by the deep learning model and in the speech synthesis model, the cost function is defined by a square of a difference between the mel spectrogram extracted from an actual audio and a mel spectrogram produced by the speech synthesis model. Therefore, the training parameter w is trained by the gradient descent so that the deep learning model produces one similar to an actual mel spectrogram. At this time, when training data is small, a phenomenon that the learning parameter is optimized to small training data occurs and overfitting which cannot correspond to the spoken sentence which is not in the training data may occur.

In the exemplary embodiment of the present disclosure, in order to solve this overfitting, early stopping which restricts the number of training is performed. The overfitting may be avoided by the early stopping, but the optimization is difficult due to the restricted number of training.

Accordingly, in order to solve this problem, according to the exemplary embodiment of the present disclosure, a speaker having a high similarity to the target speech is selected from training datasets of a plurality of speakers which are stored in advance so as to quickly find an appropriate value in a limited number of training sessions. Thereafter, the speaker embedding of the selected speaker is set as an initial value of the fine-tuned speech synthesis model. In order to select a speaker having a high similarity to the target speech, the similarity is calculated based on a tone color and a speech rate of each speaker.

Hereinafter, a method of selecting a speaker having a high similarity will be described with reference to FIGS. 5 and 6.

First, in step S131, a feature vector is extracted from the speech between speakers and calculates the similarity of the tone color by using the inner product.

In one exemplary embodiment, a feature vector of a speaker is extracted from a speech of a speaker to be compared based on a speaker recognizer. The similarity is calculated using Equation 4.

$$\text{cosine similarity } (A, B) = \frac{A \cdot B}{\|A\| \|B\|} \qquad \text{[Equation 4]}$$

Here, A and B are feature vectors extracted from the speeches of each speaker and the inner product is performed on these feature vectors to calculate a tone color similarity of two speeches.

Next, in step S132, a phoneme duration of each speaker is calculated and a phoneme duration of a trained speaker is divided by a phoneme duration of a target speaker to calculate a similarity of the speech rate.

A reference of the speech rate is a phoneme duration indicating how long phoneme is pronounced. In order to calculate the phoneme duration, the length of the speech is divided by the number of phonemes. The similarity of phoneme durations of two speakers is calculated using Equation 5.

$$R_n = \frac{T_n}{T_s} \quad \text{[Equation 5]}$$

Here, T is a phoneme duration and a similarity of phoneme durations of two speakers is a ratio obtained by dividing a phoneme duration of a trained speaker by a phoneme duration of a new speaker. When the ratio is close to 1, it means that the phoneme durations of two speakers are similar.

In step S133, a tone color similarity score between two speakers is calculated based on the similarity of the tone color and the similarity of the speech rate.

In one exemplary embodiment, based on Equations 4 and 5, in order to appropriately consider the similarity of the tone color and the speech rate, the speaker similarity score is calculated based on Equation 6.

$$S_n = V_n + (1-V_n)\{\alpha - \min(\alpha, |1-R_n|) + \beta - \max(\beta, |1-R_n|)\} \quad \text{[Equation 6]}$$

Here, $S_n$ refers to a similarity score between a target (a new speaker) and an n-th speaker among trained speakers. It means that as the similarity score is larger, the speaking characteristic is similar to that of the target speaker. $V_n$ is a tone color similarity calculated by Equation 4 and $\alpha$ and $\beta$ are experimental values, which are 0.1 and 0.25, respectively. When the difference between the speech rates is very similar through $\alpha$ and $\beta$, additional points are assigned to the tone color similarity and when the difference is significant, points are deducted.

As the similarity score calculated by Equation 6 which is a similarity score calculating equation is higher, the speaking characteristics of two speakers are similar.

FIG. 7 is a graph illustrating a speech characteristic between speakers according to a result of a similarity score calculating equation according to an exemplary embodiment of the present disclosure.

First, after performing the multi-speaker training with 100 speakers, a phoneme duration and a feature vector are extracted from the speeches of the speakers to measure a score between two speakers.

An x-axis (horizontal) of FIG. 7 indicates a distance L1 between speaker embeddings generated by the training and y-axis (vertical) indicates a score between two speakers.

As seen from the graph, the higher the similarity score between two speakers, the smaller the difference of speaker embedding between two speakers so that it is understood that the higher the similarity score, the more similar the embedding of two speakers.

In FIG. 7, a red line is a graph obtained by measuring the similarity score considering only a similarity of a tone color and a blue line is a graph representing a similarity score considering both a similarity of tone color and a similarity of the speech rate. When the red line and the blue line are compared, it is confirmed that when both the similarity of the tone color and the similarity of the speech rate are considered, the difference of the speaker embedding between the speakers is further reduced.

Returning to the step S134 of FIG. 5, in step S134, a speaker having the highest speaker similarity score is selected as a speaker having the most similar speaking characteristic.

As described above, in order to add the target speaker to the multi-speaker speech synthesis model, when a speaker embedding of the target speaker is initialized, a trained speaker embedding of a speaker having the highest similarity score, among the existing trained speakers, becomes the most suitable speaker embedding for the target speaker. Accordingly, the corresponding speaker embedding is set as an initial value to start the learning, it is sufficient to acquire speaker embedding suitable for the target speaker even with a smaller number of training sessions.

In the meantime, in order to add the target speaker to the multi-speaker speech synthesis model, when the dataset of the target speaker is trained, a score vector is used without using the one-hot vector for the target speaker. The score vector is calculated by Equation 7 by multiplying the one-hot vector of the most similar speaker selected in step S134 and the score.

$$\text{score vector} = C_m * S_m \quad \text{[Equation 7]}$$

When a score vector is used for the target speaker, it is advantageous in that a new speaker may be added without extending a magnitude of the one-hot vector.

As described above, according to the exemplary embodiment of the present disclosure, in order to supplement the insufficient training sentence of the multi-speaker training dataset, a massive single speaker training dataset having many training sentences is trained in advance. Thereafter, the training is performed with the multi-speaker training dataset and at this time, the speaker embedding table and the one-hot vector are used to condition each speaker. Thereafter, in order to add a new speaker (target speaker), the entire speech synthesis model is fine-tuned. At this time, the initial value of the speaker embedding of the new speaker selects a speaker with a similar tone color and speech rate to the target speaker and enhances the adaptation of the target speaker using a score vector obtained by multiplying a speaker similarity score and the one-hot vector, rather than the one-hot vector of the selected speaker.

For now, the present disclosure has been described with reference to the exemplary embodiments. It is understood to those skilled in the art that the present disclosure may be implemented as a modified form without departing from an essential characteristic of the present disclosure. Therefore, the disclosed exemplary embodiments may be considered by way of illustration rather than limitation. The scope of the present disclosure is presented not in the above description but in the claims and it may be interpreted that all differences within an equivalent range thereto may be included in the present disclosure.

The invention claimed is:

1. A speech synthesis method based on a multi-speaker training dataset of a speech synthesis apparatus, comprising:
   pre-training by applying a single speaker training dataset with most spoken sentences, among training datasets of a plurality of speakers, to a speech synthesis model using a previously stored neural network;
   fine-tuning the pre-trained speech synthesis model with a training dataset of the plurality of speakers; and
   converting to a mel spectrogram by applying a target speech dataset to the fine-tuned speech synthesis model, wherein the speech synthesis model conditions a target speaker based on a speaker embedding and a score vector, the score vector being calculated by:
  calculating similarity scores between the target speaker and the plurality of speakers with respect to a speaking characteristic;
  selecting a speaker, from among the plurality of speakers, based on the similarity scores, such that the selected speaker has the most similar speaking characteristic to the target speaker;
  multiplying (i) a one-hot vector identifying the selected speaker from among the plurality of speakers, with (ii) a similarity score between the target speaker and the selected speaker; and
  using a result of the multiplication as the score vector.

2. The speech synthesis method based on a multi-speaker training dataset of claim 1, further comprising:
  generating a waveform type speech file based on the mel spectrogram.

3. The speech synthesis method based on a multi-speaker training dataset of claim 1, wherein the converting to a mel spectrogram further includes:
  selecting a speaker with a high similarity to a target speech, among previously stored training datasets of the plurality of speakers, based on the target speech dataset; and
  setting speaker embedding of the selected speaker as an initial value of the fine-tuned speech synthesis model.

4. The speech synthesis method based on a multi-speaker training dataset of claim 3, wherein in the selecting a speaker with a high similarity, the similarity is calculated based on a tone color and a speech rate between speakers.

5. The speech synthesis method based on a multi-speaker training dataset of claim 4, wherein the selecting a speaker with a high similarity includes:
  calculating a similarity of a tone color by extracting a feature vector from the speech between the speakers and using the inner product;
  calculating a phoneme duration of each speaker and calculating a similarity of a speech rate by dividing the phoneme duration of the trained speaker by a phoneme duration of the target speaker;
  calculating a tone color similarity score between two speakers based on the similarity of the tone color and the similarity of the speech rate; and
  selecting a speaker with the highest tone color similarity score as a speaker with the most similar speaking characteristic.

6. The speech synthesis method based on a multi-speaker training dataset of claim 1, wherein the speech synthesis model conditions each speaker based on a trainable speaker embedding and a one-hot vector.

7. A speech synthesis apparatus based on a multi-speaker training dataset, comprising:
  a memory which stores one or more instructions; and
  a processor which executes the one or more instructions which are stored in the memory,
  wherein the processor executes the one or more instructions to pre-train a speech synthesis model using a previously stored neural network with a single speaker training dataset with most spoken sentences, among training datasets of a plurality of speakers, fine-tune the pre-trained speech synthesis model with a training dataset of the plurality of speakers, and apply a target speech dataset to the fine-tuned speech synthesis model to be converted into a mel spectrogram, and
  wherein the speech synthesis model conditions a target speaker based on a speaker embedding and a score vector, the score vector being calculated by:
    calculating similarity scores between the target speaker and the plurality of speakers with respect to a speaking characteristic;
    selecting a speaker, from among the plurality of speakers, based on the similarity scores, such that the selected speaker has the most similar speaking characteristic to the target speaker;
    multiplying (i) a one-hot vector identifying the selected speaker from among the plurality of speakers, with (ii) a similarity score between the target speaker and the selected speaker; and
    using a result of the multiplication as the score vector.

8. The speech synthesis apparatus based on a multi-speaker training dataset of claim 7, wherein the processor generates a waveform type speech file based on the mel spectrogram.

9. The speech synthesis apparatus based on a multi-speaker training dataset of claim 7, wherein the processor is configured to select a speaker with a high similarity to a target speech, among previously stored training datasets of the plurality of speakers, based on the target speech dataset; and set a speaker embedding of the selected speaker as an initial value of the fine-tuned speech synthesis model.

10. The speech synthesis apparatus based on a multi-speaker training dataset of claim 9, wherein the processor calculates the similarity based on the tone color and the speech rate between the speakers.

11. The speech synthesis apparatus based on a multi-speaker training dataset of claim 10, wherein the processor is configured to calculate a similarity of a tone color by extracting a feature vector from the speech between the speakers and using the inner product, calculate a phoneme duration of each of the speakers, calculate a similarity of a speech rate by dividing the phoneme duration of the trained speaker by a phoneme duration of the target speaker, calculate a tone color similarity score between two speakers based on the similarity of the tone color and the similarity of the speech rate, and select a speaker with the highest tone color similarity score as a speaker with the most similar speaking characteristic.

12. The speech synthesis apparatus based on a multi-speaker training dataset of claim 7, wherein the speech synthesis model conditions each speaker based on a trainable speaker embedding and a one-hot vector.

* * * * *